United States Patent
Lin et al.

(10) Patent No.: US 9,329,734 B2
(45) Date of Patent: May 3, 2016

(54) WEIGHT PRESSURE PROCESS METHOD AND SYSTEM OF SELF CAPACITIVE TOUCH SCREEN

(71) Applicant: FocalTech Systems, Ltd., George Town (KY)

(72) Inventors: Jianjun Lin, Shenzhen (CN); Wenyong Long, Shenzhen (CN); Zhiliang Zhao, Shenzhen (CN); Weiping Liu, Shenzhen (CN)

(73) Assignee: FocalTech Systems, Ltd., George Town, Grand Cayman (KY)

( * ) Notice: Subject to any disclaimer, the term of this patent is extended or adjusted under 35 U.S.C. 154(b) by 310 days.

(21) Appl. No.: 13/933,634

(22) Filed: Jul. 2, 2013

(65) Prior Publication Data

US 2014/0320443 A1    Oct. 30, 2014

(30) Foreign Application Priority Data

Apr. 25, 2013   (CN) .......................... 2013 1 0148096

(51) Int. Cl.
*G06F 3/041*   (2006.01)
*G06F 3/044*   (2006.01)

(52) U.S. Cl.
CPC .............. *G06F 3/044* (2013.01); *G06F 3/0418* (2013.01)

(58) Field of Classification Search
CPC ....... G06F 3/044; G06F 3/0412; G06F 3/041; G06F 3/0416; G06F 3/0418
USPC ........................................................... 345/173
See application file for complete search history.

(56) References Cited

U.S. PATENT DOCUMENTS

| | | | |
|---|---|---|---|
| 2003/0028346 A1* | 2/2003 | Sinclair et al. ................ | 702/150 |
| 2012/0212457 A1* | 8/2012 | Drumm ................ | G06F 3/0416 345/175 |

* cited by examiner

*Primary Examiner* — Gustavo Polo
(74) *Attorney, Agent, or Firm* — Hamre, Schumann, Mueller & Larson, P.C.

(57) ABSTRACT

The present invention relates to touch screen technology, and provide a weight pressure process method and system of the self capacitive touch screen. In the weight pressure process method and system of the self capacitive touch screen provided by the invention, a threshold relationship is used to modify the existing touch threshold, the threshold relationship uses the touch threshold and the minor change of the changes of two channels adjacent to the channel corresponding to the maximum value as variables, if the maximum value is not greater than the value of the threshold relationship, identify the point causing the current change as a fake point and filter out the fake point. In the method, the change of the self capacitor caused by the deformation due to pressure, so the actual touch point can be identified more accurately, a touch application can be performed correctly, and the user experience is improved greatly.

11 Claims, 8 Drawing Sheets

WEIGHT PRESSURE PROCESS METHOD AND SYSTEM OF SELF CAPACITIVE TOUCH SCREEN

TECHNICAL FIELD

The present invention relates to touch screen technology, and more particularly, to a weight pressure process method and system of a self capacitive touch screen with a monolayer conductive electrode structure.

BACKGROUND

Currently, the capacitive touch screen for its high reliability and durability is widely used in various types of electronic equipment. FIG. 1 shows a typical structure of the self capacitive touch screen.

as shown in FIG. 1, self capacitive touch screen generally includes: a cover plate with surface hardness, a conductive electrode for inducting user-triggered state and a bonding layer bonded between the cover plate and the conductive electrode; wherein the conductive electrode with monolayer or multilayer film structure is an transverse or longitudinal electrode array made of conductive material on the surface of the glass or thin film materials, the conductive electrode form a self capacitor Cp between the conductive electrode and ground. Its working principle is: when a finger touch the cover plate, the body is equivalent to the earth, the finger and the conductive electrode form a capacitor CF, the capacitor Cf and the self capacitor Cp are in parallel, so the induction capacitor in the corresponding channel of the conductive electrode increases; capacitive induction chip gathering the induction capacitor of each channel on real-time, when the change of the induction capacitor relative to the self capacitor Cp is greater than the touch threshold value, it is considered that there is a touch, and then calculate the touch point coordinates according to the proportionate relationships of the change of each channel of the touch point area, and then output the touch point coordinates to the main processor, so the processor execute touch application.

However, in practical applications, the self capacitive touch screen has certain deformation due to pressure, so the distance between the conductive electrode and the ground are reduced. The change of the self capacitor Cp caused by the deformation is $\Delta CP$, the change of the induction capacitor relative to the self capacitor Cp detected by the capacitive induction chip is $\Delta Cp+Cf$. The prior art ignored the influence of the change of the self capacitor $\Delta CP$ on the identification result to the touch point, while for non-touch area, if the change $\Delta CP$ is larger than the touch threshold value, the capacitive induction chip will identify there is a touch fake point in the area, which may result in inaccurate identification of the touch points, affect the proper implementation of the touch applications and reduce the user experience.

SUMMARY

The present invention provides a weight pressure process method of the self capacitive touch screen which solve the problems that the prior art ignored the influence of the change of the self capacitor on the identification result to the touch point, which may result in inaccurate identification of the touch points, affect the proper implementation of the touch applications and reduce the user experience.

The embodiment of the invention is realized as follow, a weight pressure process method of the self capacitive touch screen, the method includes:

detecting the change of the induction capacitor relative to the self capacitor of each channel in a monolayer conductive electrode;

extracting the maximum value of the change of each channel and changes of two channel adjacent to the channel corresponding to the maximum value, and then calculating value of a threshold relationship, the threshold relationship uses the touch threshold and a minor change of the changes of two channels adjacent to the channel corresponding to the maximum value as variables;

if the maximum value is not greater than the value of the threshold relationship, identify the point causing the current change as a fake point and filter out the fake point.

Another purpose of the embodiment of the invention is to provide a weight pressure process system of the self capacitive touch screen, the system includes:

a detection module, used to detect the change of the induction capacitor relative to the self capacitor of each channel in the monolayer conductive electrode;

a first calculation module, used to extract the maximum value of the change of each channel and the changes of two channel adjacent to the channel corresponding to the maximum value, and calculating the value of the threshold relationship, the threshold relationship uses the touch threshold and the minor change of the changes of two channels adjacent to the channel corresponding to the maximum value as variables;

a first identification module, used to identify the point causing the current change as a fake point and filter out the fake point, if the maximum value extracted by the first calculation module is not greater than the value of the threshold relationship calculated by the first calculation module.

Another purpose of the embodiment of the invention is to provide a capacitive induction chip, the capacitive induction chip being coupled to a monolayer conductive electrode and a main processor, wherein, the capacitive induction chip includes the above weight pressure process system of the self capacitive touch screen.

In the weight pressure process method and system of the self capacitive touch screen provided by the embodiment of the present invention, a threshold relationship is used to modify the existing touch threshold, the threshold relationship uses the touch threshold and the minor change of the changes of two channels adjacent to the channel corresponding to the maximum value as variables, if the maximum value is not greater than the value of the threshold relationship, identify the point causing the current change as a fake point and filter out the fake point. In the method, the change of the self capacitor Cp caused by the deformation due to pressure, so the actual touch point can be identified more accurately, a touch application can be performed correctly, and the user experience is improved greatly

DETAILED DESCRIPTION OF THE PREFERRED EMBODIMENTS

The realization, functional characteristics, advantages and embodiments of the present invention will be explained below in detail with reference to the accompanying drawings. it is to be appreciated that the following description of the embodiment(s) is merely exemplary in nature and is no way intended to limit the invention, its application, or uses.

In the weight pressure process method and system of the self capacitive touch screen provided by the embodiment of the present invention, a threshold relationship is used to modify the existing touch threshold, the threshold relationship uses the touch threshold and the minor change of the changes of two channels adjacent to the channel corresponding to the maximum value as variables. The realization of the invention will be explained in detail combining with the embodiments.

Embodiment One

Figure 1:
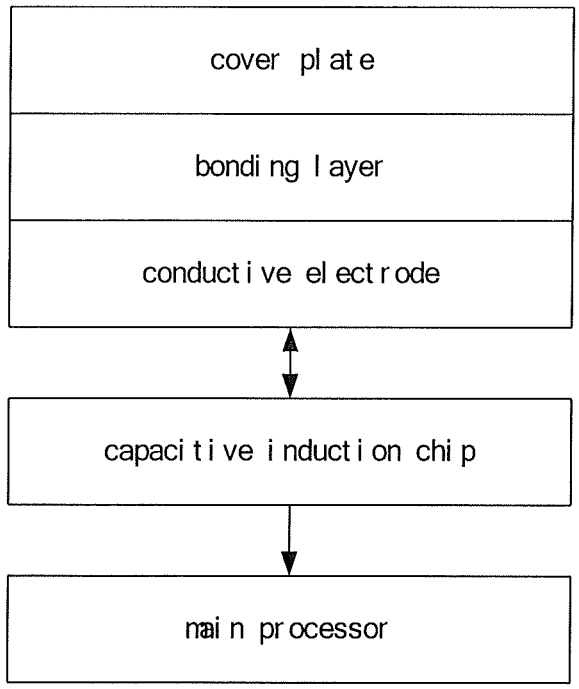
FIG. 1 is a typical structure view of a self capacitive touch screen in accordance with the prior art.
Figure 2:
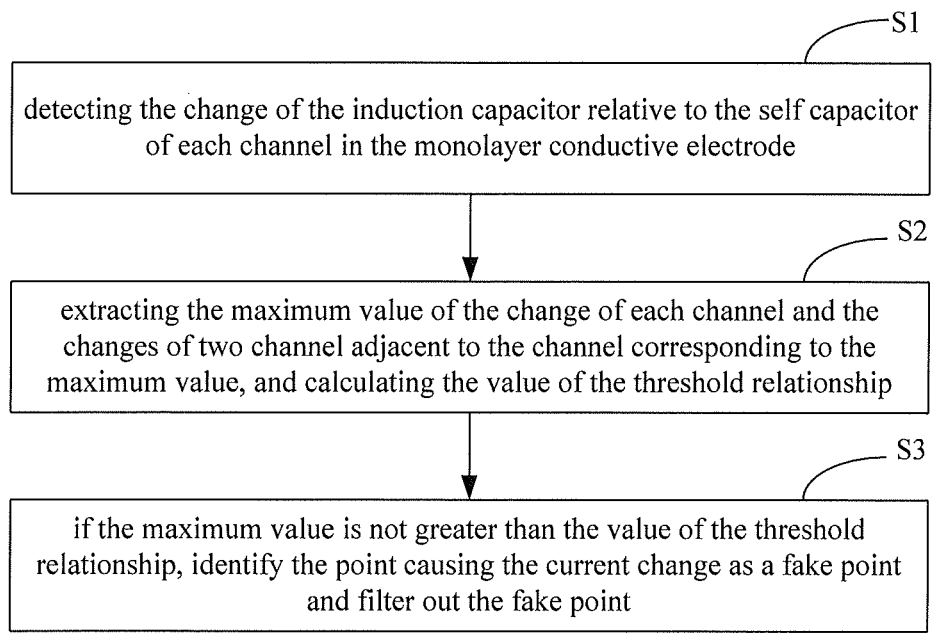
FIG. 2 is a flow chart of the weight pressure process method of the self capacitive touch screen in accordance with the first embodiment of the present invention.

The embodiment of the invention provides a weight pressure process method of the self capacitive touch screen, shown in FIG. 2, including:

Step S1: detecting the change of the induction capacitor relative to the self capacitor of each channel in the monolayer conductive electrode;

Step S2: extracting the maximum value of the change of each channel and the changes of two channel adjacent to the channel corresponding to the maximum value, and calculating the value of the threshold relationship, the threshold relationship uses the touch threshold and the minor change of the changes of two channels adjacent to the channel corresponding to the maximum value as variables;

further, the threshold relationship is as follow:

$$\text{Diff\_ref} \times \text{Ratio} + Q$$

Therein, the Diff_ref indicating the minor change of the changes of two channels adjacent to the channel corresponding to the maximum value, the Ratio indicating a proportional coefficient, the Q indicating the touch threshold, Proportional coefficient Ratio can be fine-tuned according to actual system.

Step S3: if the maximum value is not greater than the value of the threshold relationship, identify the point causing the current change as a fake point and filter out the fake point.

In the embodiment one of the invention, filtering out the fake point means to perform the touch application, but not calculating the coordinates of the point causing the current change or not outputting the coordinates of the point causing the current change, or not based on the coordinates of the point causing the current change.

In the weight pressure process method of the self capacitive touch screen provided by the embodiment one, a threshold relationship is used to modify the existing touch threshold, the threshold relationship uses the touch threshold and the minor change of the changes of two channels adjacent to the channel corresponding to the maximum value as variables, if the maximum value is not greater than the value of the threshold relationship, identify the point causing the current change as a fake point and filter out the fake point. In the method, the change of the self capacitor Cp caused by the deformation due to pressure, so the actual touch point can be identified more accurately, a touch application can be performed correctly, and the user experience is improved greatly.

Embodiment Two

Figure 3:
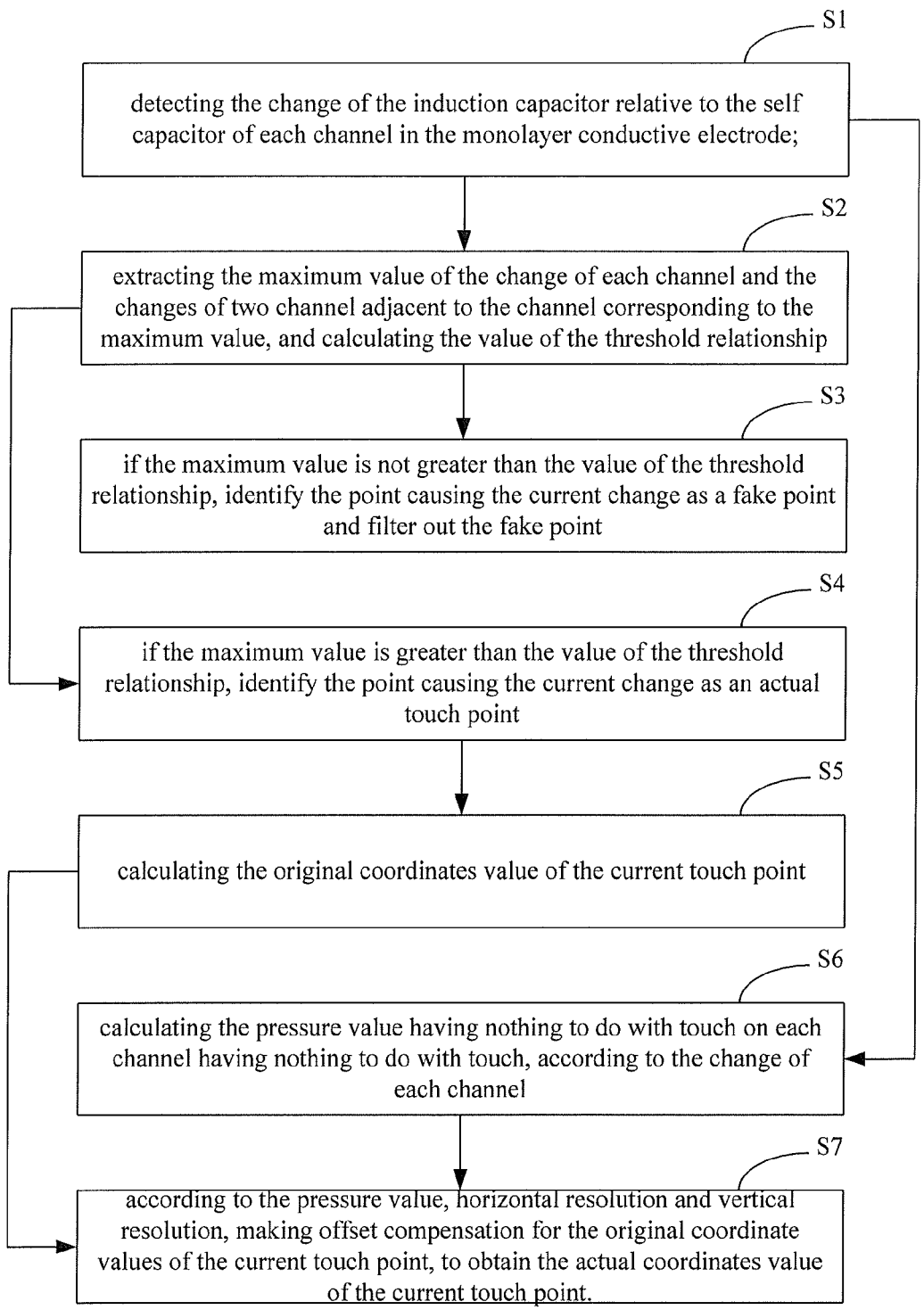
FIG. 3 is a flow chart of the weight pressure process method of the self capacitive touch screen in accordance with the second embodiment of the present invention.
Figure 4:
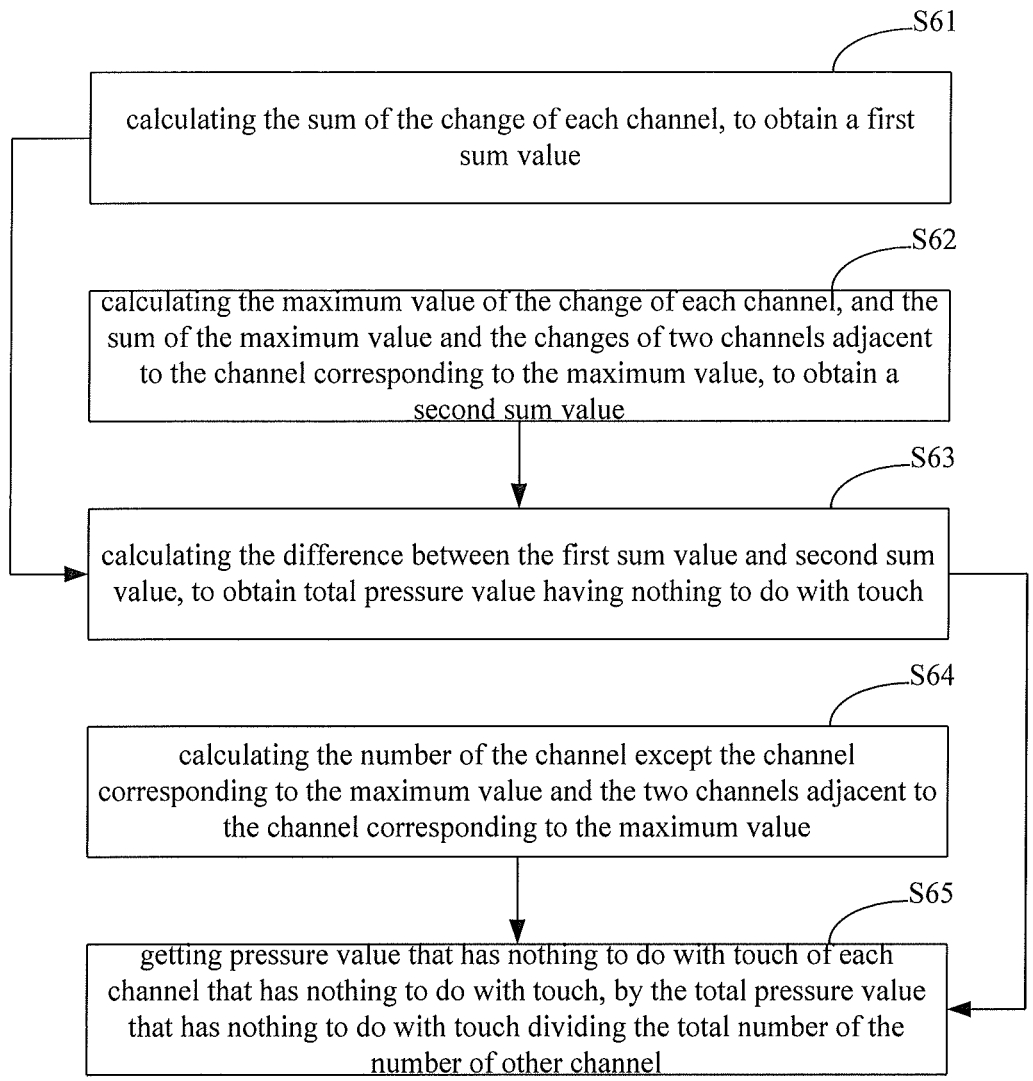
FIG. 4 is a detail flow chart of calculating the pressure having nothing to do with the touch in accordance with the second embodiment of the present invention.

The embodiment two of the invention provides a weight pressure process method of the self capacitive touch screen, shown in FIG. 3, different with the embodiment one, based on the embodiment one, after the step S3, further includes:

step S4, if the maximum value is greater than the value of the threshold relationship, identify the point causing the current change as an actual touch point;

step S5, calculating the original coordinates value of the current touch point;

step S6, calculating the pressure value having nothing to do with touch on each channel having nothing to do with touch, according to the change of each channel;

Further, as show in FIG. 4, the step S6 includes:

step S61, calculating the sum of the change of each channel, to obtain a first sum value;

step S62, calculating the maximum value of the change of each channel, and the sum of the maximum value and the changes of two channels adjacent to the channel corresponding to the maximum value, to obtain a second sum value;

step S63, calculating the difference between the first sum value and second sum value, to obtain total pressure value having nothing to do with touch;

step S64, calculating the number of the channel except the channel corresponding to the maximum value and the two channels adjacent to the channel corresponding to the maximum value;

step S65, getting pressure value that has nothing to do with touch of each channel that has nothing to do with touch, by the total pressure value that has nothing to do with touch dividing the total number of the number of other channel.

step S7, according to the pressure value, horizontal resolution and vertical resolution, making offset compensation for the original coordinate values of the current touch point, to obtain the actual coordinates value of the current touch point.

Figure 5:
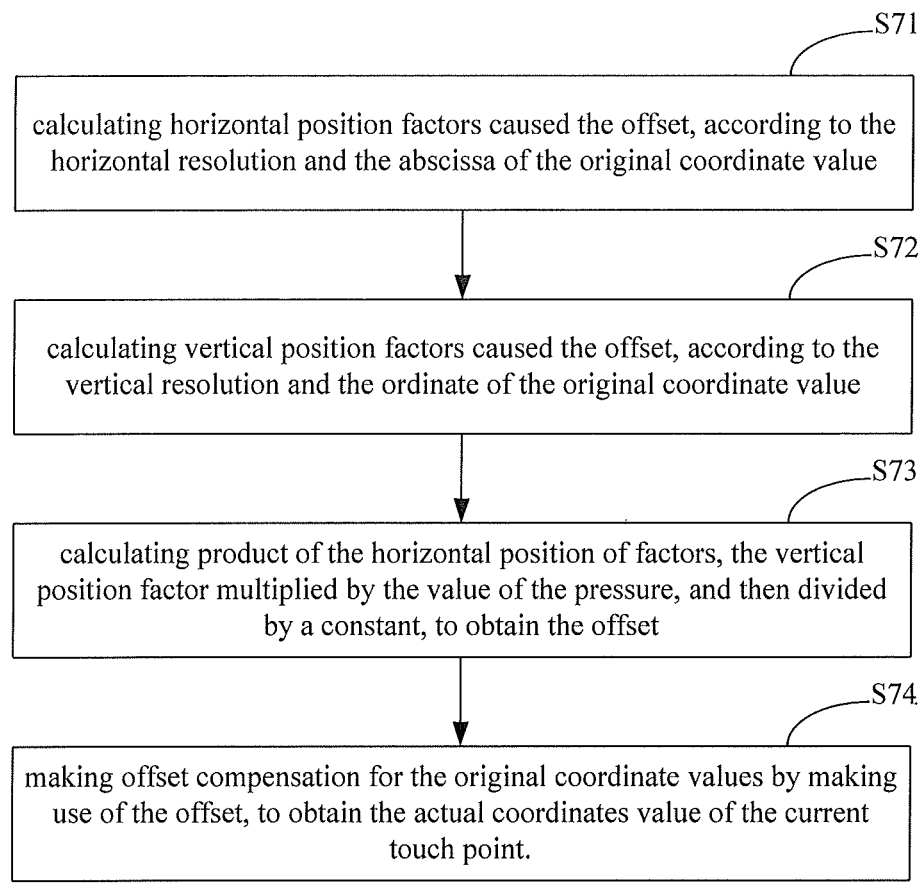
FIG. 5 is a detail flow chart of making offset compensation for the original coordinate values of the current touch point in accordance with the second embodiment of the present invention.

Further, as show in FIG. 5, the step S7 includes:

step S71, calculating horizontal position factors caused the offset, according to the horizontal resolution and the abscissa of the original coordinate value;

step S72, calculating vertical position factors caused the offset, according to the vertical resolution and the ordinate of the original coordinate value;

step S73, calculating product of the horizontal position of factors, the vertical position factor multiplied by the value of the pressure, and then divided by a constant, to obtain the offset;

step S74, making offset compensation for the original coordinate values by making use of the offset, to obtain the actual coordinates value of the current touch point.

Figure 6:
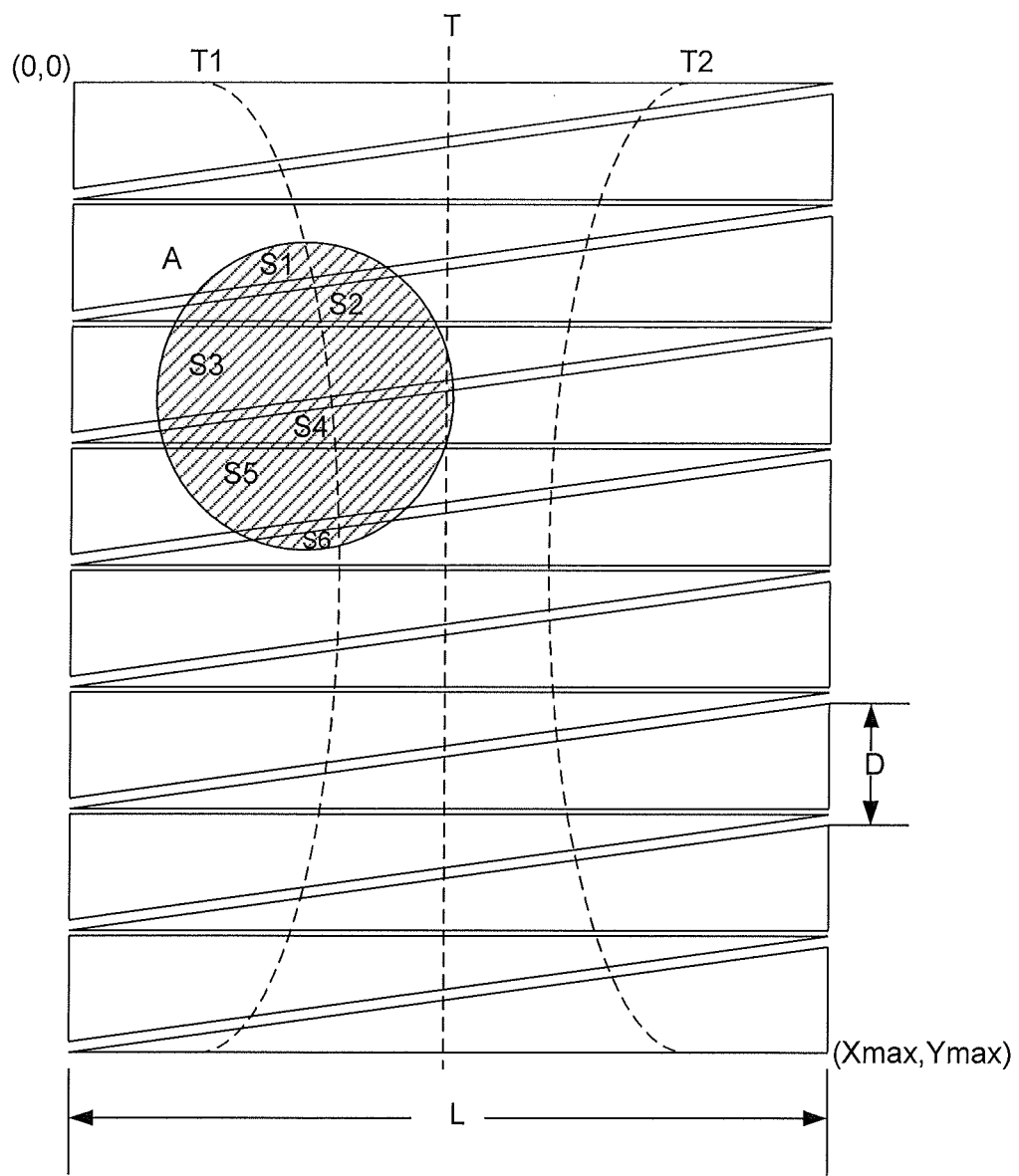
FIG. 6 is a schematic view of arising the offset of the coordinate, when there is a touch on the monolayer conductive electrode with two rows of transverse triangular pattern in accordance with the embodiment of the present invention.

Taking the self capacitive touch screen has two rows of transverse triangular pattern for example, to explain the method in the embodiment two of the invention:

As show in FIG. 6, firstly, the step S1 to step S3 were performed, to filter out the false, specifically, after the step S1 was performed, in the step S2, extracting the maximum value of the change of each channel Diff_p, the changes of previous channel adjacent to the channel corresponding to the maximum value Diff_p is Diff_left, the changes of after channel adjacent to the channel corresponding to the maximum value Diff_p is Diff_right, and then selecting the minor value from the Diff_left and Diff_right as variable Diff_ref, and then calculating the value of the threshold relationship Diff_ref× Ratio+Q. if the maximum value (Diff_ref×Ratio+Q), in the step S3, identifying the point causing the current change as a fake point and filter out the fake point.

Then, the step S4 to step S7 were performed, to compensate offset of the touch, specifically, if the maximum value Diff_p>(Diff_ref×Ratio+Q), in the step S4, identifying the point causing the current change an actual touch point, as show in FIG. 6, the shaded area A is the actual touch point identified by the step S4. After, in the step S5, supposing, the width of the conductive electrode is L, the height of each group of conductive electrode is D, the group number of the conductive electrode is n, the change of the right side electrode is x' p(n), the change of the left electrode is xp(n), a original abscissa of the touch point is $X_0$, the original ordinate of the touch point is $Y_0$, there is:

$$X_0 = \frac{\sum_{n=1...k} x'p(n)}{\sum_{n=1...k} xp(n) + \sum_{n=1...k} x'p(n)} \times L$$

$$Y_0 = \frac{\sum_{n=1...k} yp(n) \times n}{\sum_{n=1...k} yp(n)} \times D$$

$$yp(n) = x'p(n) + xp(n)$$

Then, in the step S6, calculating the pressure value having nothing to do with touch on each channel having nothing to do with touch, specifically, in the step S61, calculating the sum of the change of each channel in all conductive electrode, to obtain a first sum value sum1, in the step S62, calculating the sum of the Diff_p, Diff_right与Diff_left, to obtain a second sum value sum2; in the step S63, calculating the total pressure value having nothing to do with touch by sum=sum1-sum2; in the step S64, calculating the number of the channel except the channel corresponding to the maximum value and the two channels adjacent to the channel corresponding to the maximum value n'; in the step S65, calculating pressure value having nothing to do with touch on each channel having nothing to do with touch CH=(sum1-sum2)/n'.

In the step S7, the offset compensation for the original coordinate values of the current touch point is made, to obtain the actual coordinates value of the current touch point. Because of superposition of the weight pressure effect, the abscissa is approximately:

$$X_0' = \frac{\Box Cp + \sum_{n=1...k} x'p(n)}{\Box Cp \times 2 + \sum_{n=1...k} xp(n) + \sum_{n=1...k} x'p(n)} \times L$$

Supposing, the horizontal resolution is Xmax, when $X_0$<Xmax/2, the abscissa after the superposition of the weight pressure is $X_0'$>$X_0$, that is, the abscissa after the superposition of the weight pressure is shift right, such as the dotted line T1 show in FIG. 6; and when $X_0$>Xmax/2, the abscissa after the superposition of the weight pressure is $X_0'$<$X_0$, that is, the abscissa after the superposition of the weight pressure is shift left, such as the dotted line T2 show in FIG. 6. so, the affect of the weight pressure is to make the each point with the same abscissa shift to the center line T. So, the S7 further includes: in the step S71, supposing, the horizontal resolution is Xmax, calculating horizontal position factors caused the offset Cx=|$X_0$−Xmax/2|; in the step S72, the vertical resolution is Ymax, calculating vertical position factors caused the offset Cy=Ymax/2−|$Y_0$−Ymax/2|, in the step S73, calculating the offset via ΔX=Cx×Cy×CH/A, therein, A is a constant and can be fine-tuned according to actual system; in the step S74, making offset compensation for the original ordinate and original abscissa, when $X_0$<Xmax/2, the actual abscissa is X1=$X_0$−ΔX, when $X_0$>Xmax/2, the actual abscissa is X1=$X_0$+ΔX, the actual ordinate is Y1=$Y_0$.

Figure 7A:
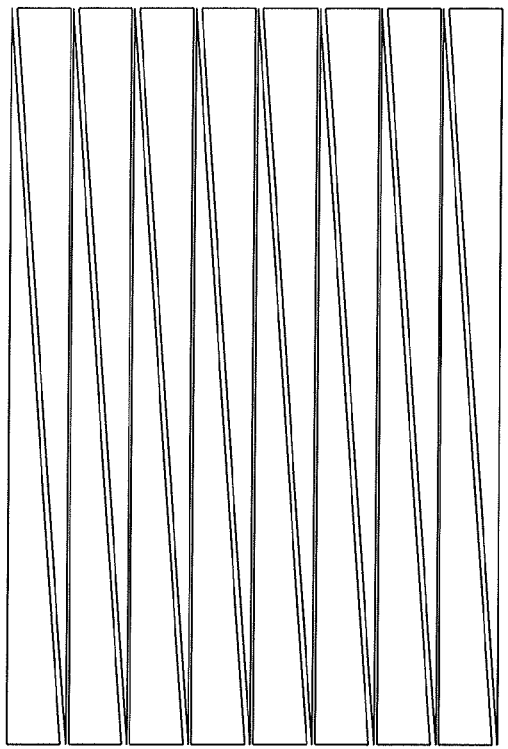
FIG. 7A is a schematic view of the monolayer conductive electrode with two rows of vertical triangular pattern in accordance with the prior art.
Figure 7B:
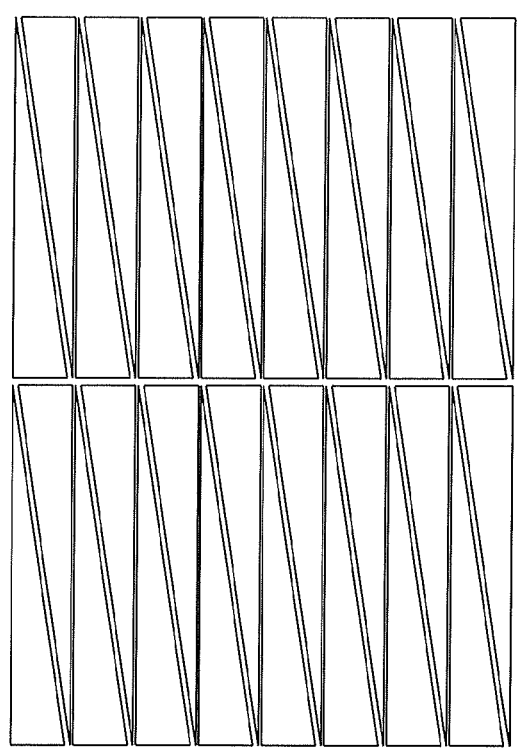
FIG. 7B is a schematic view of the monolayer conductive electrode with four rows of vertical triangular pattern in accordance with the prior art.

In practical, the monolayer conductive electrodes in the self capacitive touch screen can also be two rows of vertical triangular pattern as shown in FIG. 7A, or four rows of vertical triangular pattern, of course as shown in FIG. 7B, and of course can be etched with other shaped pattern, the basic principle is similar to the process method of the two horizontal triangular pattern, so it is not repeat here.

The embodiment two of the invention provides a weight pressure process method of the self capacitive touch screen based on the embodiment one, according to the pressure value, horizontal position factors and vertical position factors, making offset compensation for the actual touch point. In practical, the fake point is filtered out, but also the coordinates of the actual touch point can be corrected, the touch application can be performed correctly, and the user's experience is improved greatly.

Embodiment Three

Figure 8:
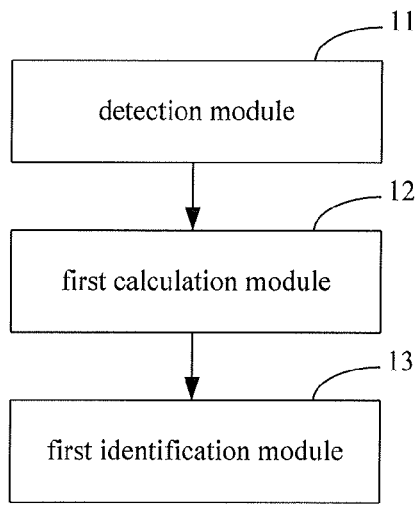
FIG. 8 is a structure view the weight pressure process system of the self capacitive touch screen in accordance with the third embodiment of the present invention.

The embodiment three of the invention provides a weight pressure process system of the self capacitive touch screen, shown in FIG. 8, includes:

a detection module 11, used to detect the change of the induction capacitor relative to the self capacitor of each channel in the monolayer conductive electrode;

a first calculation module 12, used to extract the maximum value of the change of each channel and the changes of two channel adjacent to the channel corresponding to the maximum value, and calculating the value of the threshold relationship, the threshold relationship uses the touch threshold and the minor change of the changes of two channels adjacent to the channel corresponding to the maximum value as variables;

a first identification module 13, used to identify the point causing the current change as a fake point and filter out the fake point, if the maximum value extracted by the first calculation module 12 is not greater than the value of the threshold relationship calculated by the first calculation module 12.

Therein, the description of filtering out the fake point is as the description in the embodiment one, so it is not repeated here.

Further, the threshold relationship is as follow:

$$\text{Diff\_ref} \times \text{Ratio} + Q$$

therein, the Diff_ref indicates the minor change of the changes of two channels adjacent to the channel corresponding to the maximum value, the Ratio indicates a proportional coefficient, the Q indicates the touch threshold.

In the weight pressure process method of the self capacitive touch screen provided by the embodiment three, a threshold relationship is used to modify the existing touch threshold, the threshold relationship uses the touch threshold and the minor change of the changes of two channels adjacent to the channel corresponding to the maximum value as variables, if the maximum value is not greater than the value of the threshold relationship, identify the point causing the current change as a fake point and filter out the fake point. In the method, the change of the self capacitor Cp caused by the deformation due to pressure, so the actual touch point can be identified more accurately, a touch application can be performed correctly, and the user experience is improved greatly.

Embodiment Four

Figure 9:
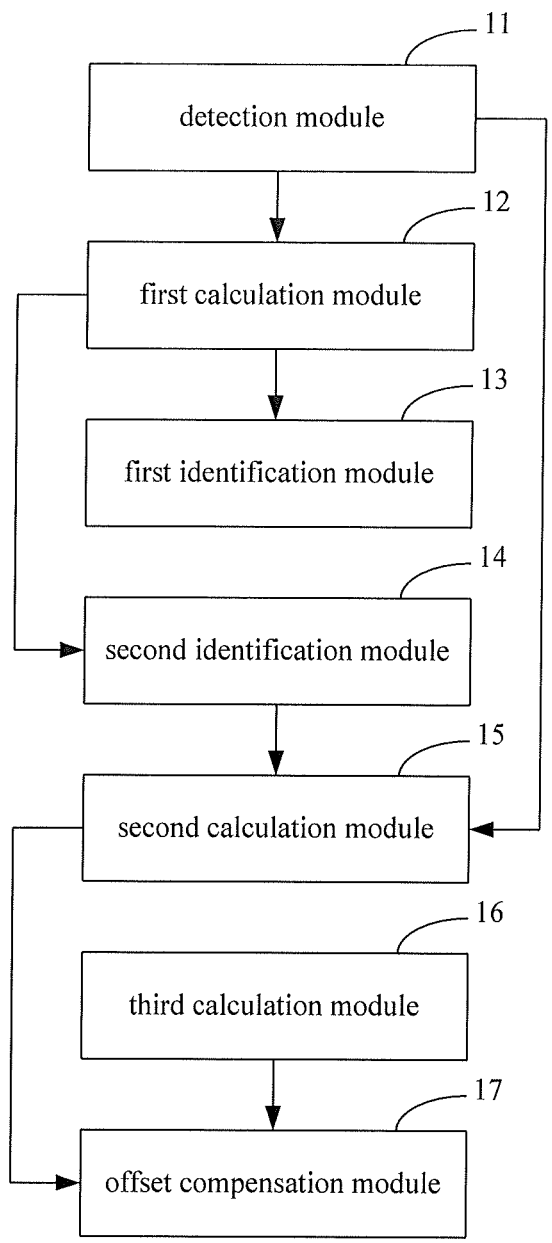
FIG. 9 is a structure view the weight pressure process system of the self capacitive touch screen in accordance with the fourth embodiment of the present invention.

The embodiment four of the invention provides a weight pressure process system of the self capacitive touch screen, as shown in FIG. 9.

The embodiment four is different from the embodiment three, based on embodiment three, the system further includes:

a second identification module 14, used to identify the point causing the current change as an actual touch point, if the maximum value extracted by the first calculation module 12 is not greater than the value of the threshold relationship calculated by the first calculation module 12;

a second calculation module 15, used to calculated the original coordinates value of the current touch point identified by the second identification module 14;

a third calculation module 16, used to calculate the pressure value having nothing to do with touch on each channel having nothing to do with touch, according to the change of each channel detected by the detection module 11;

an offset compensation module 17, used to make offset compensation for the original coordinate values of the current touch point calculated by the second calculation module 15, to obtain the actual coordinates value of the current touch point, according to the pressure value calculated by the third calculation module 16, horizontal resolution and vertical resolution.

Figure 10:
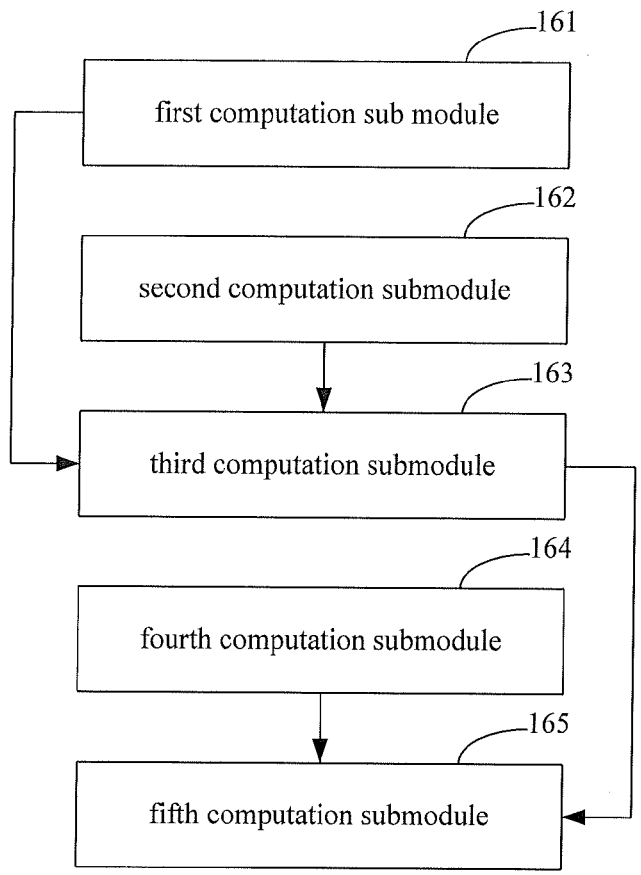
FIG. 10 is a structure view of the third calculation module as show in FIG. 9.
Figure 11:
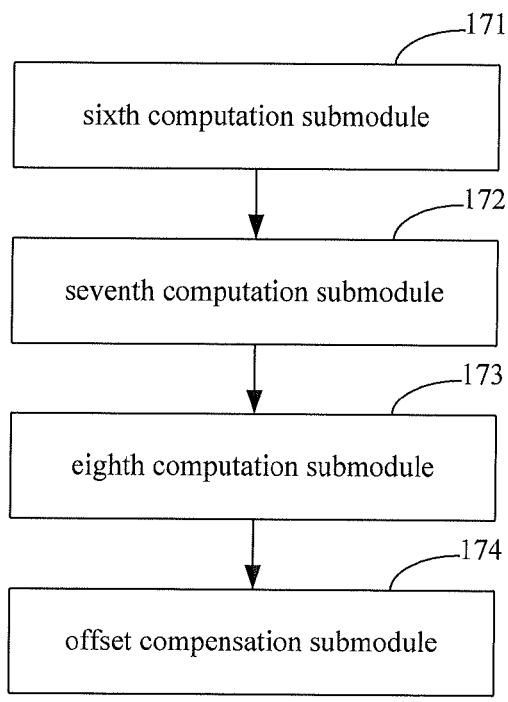
FIG. 11 is a structure view of the offset compensation module as show in FIG. 9.

Further, as shown in FIG. 10, the third calculation module 16 comprises:

a first computation sub module 161, used to calculate the sum of the change of each channel, to obtain a first sum value;

a second computation submodule 162, used to calculate the maximum value of the change of each channel, and the sum of the maximum value and the changes of two channels adjacent to the channel corresponding to the maximum value, to obtain a second sum value;

a third computation submodule 163, used to calculate the difference between the first sum value and second sum value, to obtain total pressure value having nothing to do with touch;

a fourth computation submodule 164, used to calculate the number of the channel except the channel corresponding to the maximum value and the two channels adjacent to the channel corresponding to the maximum value;

a fifth computation submodule 165, used to getting pressure value that has nothing to do with touch of each channel that has nothing to do with touch, by the total pressure value that has nothing to do with touch dividing the total number of the number of other channel;

Further, as shown in FIG. 11, the offset compensation module 17 includes:

a sixth computation submodule 171, used to calculate horizontal position factors caused the offset, according to the horizontal resolution and the abscissa of the original coordinate value;

a seventh computation submodule 172, used to calculate vertical position factors caused the offset, according to the vertical resolution and the ordinate of the original coordinate value;

an eighth computation submodule 173, used to calculate product of the horizontal position of factors, the vertical position factor multiplied by the value of the pressure, and then divided by a constant, to obtain the offset;

an offset compensation submodule 174, used to make offset compensation for the original coordinate values by making use of the offset, to obtain the actual coordinates value of the current touch point.

The embodiment four of the invention provides a weight pressure process method of the self capacitive touch screen based on the embodiment three, according to the pressure value, horizontal position factors and vertical position factors, making offset compensation for the actual touch point. In practical, the fake point is filtered out, but also the coordinates of the actual touch point can be correct, the touch application can be performed correctly, and the user experience is improved greatly.

Embodiment Five

The embodiment fifth of the invention provides a capacitive induction chip, the capacitive induction chip being coupled to a monolayer conductive electrode and a main processor, the capacitive induction chip includes the weight pressure process system of the self capacitive touch screen as show is the embodiment four or the embodiment fifth, which is not repeat here, wherein, the detection module 11 is connected to the monolayer conductive electrode, and the first identification module 13 or/and the offset compensation module 17 are connected to the main processor.

As the skilled in the field can understand that all or part of the steps of the above-described embodiment of the method can be completed by controlling the relevant hardware by a program, the program can be stored in a computer readable storage medium, the storage medium, such as ROM/RAM, disk, CD-ROM and so on.

The above-mentioned description is only a preferred embodiment of the present invention, which is not therefore limit the patent range of the present invention. Any equivalent structures, or equivalent processes transform or the direct or indirect use in other related technical fields made by the specification and the FIGS. of the present invention are similarly included the range of the patent protection of the present invention.

What is claimed is:

1. A weight pressure process method of the self capacitive touch screen, wherein, the method comprising:

detecting a variation of the induction capacitor relative to the self capacitor of each channel in a monolayer conductive electrode;

extracting a maximal variation among the variations of the channels and the variations of two channels adjacent to a channel corresponding to the maximal variation;

calculating a value of a threshold relationship using a touch threshold and a minor variation of the variations of two channels adjacent to the channel corresponding to the maximal variation as variables;

identifying a point causing a current change as a fake point based on the maximal variation; and filtering out the fake point if the maximal variation is not greater than the value of the threshold relationship.

2. The weight pressure process method of the self capacitive touch screen as claimed in claim 1, wherein, the threshold relationship is as follows:

$$Diff\_ref \times Ratio + Q$$

wherein, the Diff_ref indicates the minor variation of the variations of two channels adjacent to the channel corresponding to the maximal variation, the Ratio indicates a proportional coefficient, and the Q indicates the touch threshold.

3. The weight pressure process method of the self capacitive touch screen as claimed in claim 2, further comprising:
   identifying the point causing the current variation as an actual touch point if the maximal variation is greater than the value of the threshold relationship;
   calculating an original coordinates value of a current touch point;
   calculating a pressure value that is not caused by a touch on each channel and which is not affected by the touch, according to the variation of each channel;
   based on the pressure value, a horizontal resolution and a vertical resolution, making an offset compensation for the original coordinate values of the current touch point to obtain the actual coordinates value of the current touch point.

4. The weight pressure process method of the self capacitive touch screen as claimed in claim 3, wherein calculating the pressure value further comprises:
   calculating a sum of the variation of the channels, to obtain a first sum value;
   calculating a sum of the maximal variation among the variations of the channels and the variations of two channels adjacent to the channel corresponding to the maximal variation, to obtain a second sum value;
   calculating the difference between the first sum value and second sum value, to obtain a total pressure value which is not caused by the touch;
   calculating a number of the channel except the channel corresponding to the maximal variation and the two channels adjacent to the channel corresponding to the maximal variation;
   getting pressure value which is not caused by the touch of each channel which is not affected by the touch, by dividing the total pressure value which is not caused by the touch by the total number of the number of other channel.

5. The weight pressure process method of the self capacitive touch screen as claimed in claim 3, wherein making offset compensation for the original coordinate values of the current touch point to obtain the actual coordinates value of the current touch point further comprises:
   calculating horizontal position factors caused by the offset, according to the horizontal resolution and the abscissa of the original coordinate value;
   calculating vertical position factors caused by the offset according to the vertical resolution and the ordinate of the original coordinate value;
   calculating product of the horizontal position of factors, the vertical position factor multiplied by the value of the pressure, and then divided by a constant, to obtain the offset.

6. The weight pressure process method of the self capacitive touch screen as claimed in claim 5, wherein, the monolayer conductive electrode has two rows of transverse triangular pattern; the horizontal position factors Cx satisfy: $Cx=|X_0-Xmax/2|$, the $X_0$ is the abscissa of the original coordinate value, the Xmax is the Y horizontal resolution; the vertical position factors Cy satisfy: $Cy=Ymax/2-|Y_0-Ymax/2|$, the $Y_0$ is the ordinate of the original coordinate value, the Ymax is the vertical resolution;
   When $X_0<Xmax/2$, the actual abscissa in the actual coordinates X1 satisfy:
   $X1=X_0-\Delta X$, When $X_0<Xmax/2$, the actual abscissa in the actual coordinates X1 satisfy: $X1=X_0+\Delta X$, the $\Delta X$ is the offset; and the actual ordinate in the actual coordinates Y1 satisfy: $Y1=Y_0$.

7. A weight pressure process system of a self capacitive touch screen, the system comprising:
   a detection module, used to detect a variation of the induction capacitor relative to a self capacitor of each channel in a monolayer conductive electrode;
   a first calculation module, used to extract a maximal variation among the variations of the channels and the variations of two channels adjacent to a channel corresponding to the maximal variation, and calculating a value of a threshold relationship, the threshold relationship uses a touch threshold and a minor variation of the variations of two channels adjacent to the channel corresponding to the maximal variation as variables;
   a first identification module, used to identify a point causing the current variation as a fake point and filter out the fake point, if the maximal variation extracted by the first calculation module is not greater than the value of the threshold relationship calculated by the first calculation module.

8. The weight pressure process system of the self capacitive touch screen as claimed in claim 7, wherein, the system further comprises:
   a second identification module, used to identify the point causing the current variation as an actual touch point, if the maximal variation extracted by the first calculation module is not greater than the value of the threshold relationship calculated by the first calculation module;
   a second calculation module, used to calculate an original coordinates value of a current touch point identified by the second identification module;
   a third calculation module, used to calculate a pressure value which is not caused by a touch on each channel which is not affected by the touch, according to the variation of each channel detected by the detection module;
   an offset compensation module, used to make offset compensation for the original coordinate values of the current touch point calculated by the second calculation module, to obtain the actual coordinates value of the current touch point, according to the pressure value calculated by the third calculation module, horizontal resolution and vertical resolution.

9. The weight pressure process system of the self capacitive touch screen as claimed in claim 8, wherein the third calculation module comprises:
   a first computation submodule, used to calculate a sum of the variation of each channel, to obtain a first sum value;
   a second computation submodule, used to calculate a sum of the maximal variation among the variations of the channels and the variations of two channels adjacent to the channel corresponding to the maximal variation, to obtain a second sum value;
   a third computation submodule, used to calculate the difference between the first sum value and second sum value to obtain total pressure value which is not caused by the touch;

a fourth computation submodule, used to calculate a number of the channel except the channel corresponding to the maximal variation and the two channels adjacent to the channel corresponding to the maximal variation;

a fifth computation submodule, used to getting pressure value which is not caused by the touch of each channel which is not affected by the touch, by dividing the total pressure value which is not caused by the touch by a total number of the number of other channel;

the offset compensation module includes:

a sixth computation submodule, used to calculate horizontal position factors caused the offset, according to the horizontal resolution and the abscissa of the original coordinate value;

a seventh computation submodule, used to calculate vertical position factors caused the offset, according to the vertical resolution and the ordinate of the original coordinate value;

an eighth computation submodule, used to calculate product of the horizontal position of factors, the vertical position factor multiplied by the value of the pressure, and then divided by a constant ,to obtain the offset;

an offset compensation submodule, used to make offset compensation for the original coordinate values, to obtain the actual coordinates value of the current touch point, making use of the offset.

10. A capacitive induction chip, the capacitive induction chip being coupled to a monolayer conductive electrode and a main processor, wherein the capacitive induction chip comprises the weight pressure process system of the self capacitive touch screen as claimed from claim 7.

11. A capacitive induction chip, the capacitive induction chip being coupled to a monolayer conductive electrode and a main processor, wherein the capacitive induction chip comprises the weight pressure process system of the self capacitive touch screen as claimed from claim 8.

* * * * *